Sept. 12, 1967
I. McMURREN ET AL
3,341,846
TRANSPONDER SYSTEM
Filed Nov. 12, 1964
4 Sheets-Sheet 1

INVENTORS
Irving McMurren
Kenneth Dalsing
By Smyth, Roston & Pavitt
Attorneys

TRANSPONDER SYSTEM

Filed Nov. 12, 1964 4 Sheets-Sheet 2

INVENTORS
Irving McMurren
Kenneth Dalsing
By Smyth, Roston & Pavitt
Attorneys

Sept. 12, 1967 I. McMURREN ET AL 3,341,846

TRANSPONDER SYSTEM

Filed Nov. 12, 1964 4 Sheets-Sheet 3

INVENTOR
IRVING McMURREN
KENNETH DALSING

FIG. 5

| | | | | | |
|---|---|---|---|---|---|
| GATE 44-1 | B | C | E | G | J |
| -2 | B | D | E | G | J |
| -3 | B | C | F | G | J |
| -4 | B | D | F | G | J |
| -5 | B | C | E | H | J |
| -6 | B | D | E | H | J |
| -7 | B | C | F | H | J |
| -8 | B | D | F | H | J |
| -9 | B | C | E | G | K |
| -10 | B | D | E | G | K |
| -11 | B | C | F | G | K |
| -12 | B | D | F | G | K |
| -13 | B | C | E | H | K |
| -14 | B | D | E | H | K |
| -15 | B | C | F | H | K |
| -16 | B | D | F | H | K |

FIG. 6

| | A | B | C | D | E | F | G | H | J | K |
|---|---|---|---|---|---|---|---|---|---|---|
| RESET | 1 | | 1 | | 1 | | 1 | | 1 | |
| PULSE P"#1 | | 1 | 1 | | 1 | | 1 | | 1 | |
| # 2 | 1 | | | 1 | 1 | | 1 | | 1 | |
| # 3 | | 1 | | 1 | 1 | | 1 | | 1 | |
| # 4 | 1 | | 1 | | | 1 | 1 | | 1 | |
| # 5 | | 1 | 1 | | | 1 | 1 | | 1 | |
| # 6 | 1 | | | 1 | | 1 | 1 | | 1 | |
| # 7 | | 1 | | 1 | | 1 | 1 | | 1 | |
| # 8 | 1 | | 1 | | 1 | | | 1 | 1 | |
| # 9 | | 1 | 1 | | 1 | | | 1 | 1 | |
| # 10 | 1 | | | 1 | 1 | | | 1 | 1 | |
| # 11 | | 1 | | 1 | 1 | | | 1 | 1 | |
| # 12 | 1 | | 1 | | | 1 | | 1 | 1 | |
| # 13 | | 1 | 1 | | | 1 | | 1 | 1 | |
| # 14 | 1 | | | 1 | | 1 | | 1 | 1 | |
| # 15 | | 1 | | 1 | | 1 | | 1 | 1 | |
| # 16 | 1 | | 1 | | 1 | | 1 | | | 1 |
| # 17 | | 1 | 1 | | 1 | | 1 | | | 1 |
| # 18 | 1 | | | 1 | 1 | | 1 | | | 1 |
| # 19 | | 1 | | 1 | 1 | | 1 | | | 1 |
| #20 | 1 | | 1 | | | 1 | 1 | | | 1 |
| #21 | | 1 | 1 | | | 1 | 1 | | | 1 |
| #22 | 1 | | | 1 | | 1 | 1 | | | 1 |
| #23 | | 1 | | 1 | | 1 | 1 | | | 1 |
| #24 | 1 | | 1 | | 1 | | | 1 | | 1 |
| #25 | | 1 | 1 | | 1 | | | 1 | | 1 |
| #26 | 1 | | | 1 | 1 | | | 1 | | 1 |
| #27 | | 1 | | 1 | 1 | | | 1 | | 1 |
| #28 | 1 | | 1 | | | 1 | | 1 | | 1 |
| #29 | | 1 | 1 | | | 1 | | 1 | | 1 |
| #30 | 1 | | | 1 | | 1 | | 1 | | 1 |
| #31 | | 1 | | 1 | | 1 | | 1 | | 1 |

INVENTOR
IRVING McMURREN
KENNETH DALSING 3,341,846
Patented Sept. 12, 1967

3,341,846

TRANSPONDER SYSTEM

Irving McMurren, Los Angeles, and Kenneth Dalsing, Northridge, Calif., assignors, by mesne assignments, to The Bendix Corporation, Baltimore, Md., a corporation of Delaware Filed Nov. 12, 1964, Ser. No. 410,604
6 Claims. (Cl. 343—6.8)

The present invention relates to a transponder of the type which replies to interrogation signals from a remotely positioned station, whereby the character of the interrogation signal received determines the type of reply to be transmitted by the transmitter portion of the transponder.

Transponder of this type are usually installed in airplanes and the interrogation signals are issued by a ground station requiring the aircraft to identify itself and to furnish condition information such as altitude above ground. The interrogation signals when received by the transponder aboard the aircraft are analyzed and the transponder transmits a reply in the form of a pulse train to be received at the ground station.

These pulses are arranged in sequences to provide coded aircraft identifications and altitude information. Since the ground-aircraft-ground data link does not depend upon a reflected signal the size of the aircraft is irrelevant and enables the ground station to detect transponder equipped aircraft at very long ranges without the use of other radar or voice communication. This transponder information allows the air traffic control system to function in a more efficient manner that enhances safety and economics of aviation.

The transponder that is the object of the present invention includes an aircraft transponder antenna picking up signals from the ground station which are applied through a diplexer, a preselector and a radio frequency amplifier to a mixer in which signals are heterodyned with the output signals of a local oscillator. The resulting intermediate frequency is applied to an IF amplifier which increases the signal strength to a level sufficient for video amplification. Subsequent to the video amplification a desensitizing circuit is provided in order to reduce the receiver sensitivity for echo suppression purposes. The interrogation signal is broadcasted by the ground station in form of a direction signal, i.e., the broadcasting antenna has a strong directional component. In case the aircraft is rather close to the ground station, however, the side lobes of the directional radiation pattern still might be picked up by the transponder in the aircraft, but a reply to such side lobe interrogation signals is undesired. Therefore, the desensitizing circuit enables the transponder to distinguish between the main lobe and side lobe signals in order to permit suppression of side lobe interrogation signals.

The pulses are further analyzed in a rejection circuit as to pulse width in order to eliminate stray pulses or signals from other stations operating on the same band. Pulses having too narrow or too wide a pulse width are to be eliminated, so that the rejection circuit limits the passage of pulses to those having a width within a predetermined tolerance range. Subsequently, the pulse sequence which forms the interrogation code proper is decoded to provide individual signals respectively representative of the type of interrogation. Alternatively, side lobe interrogations are decoded as such and used to suppress the initiation of any reply thereto.

In case of any main lobe interrogation, for example, an identification interrogation, a signal is generated in a first channel for purposes of initiating and controlling a response thereto; in case another code is received, a different signal is provided in a second channel to control a reply to an interrogation, for example, as to the height of the plane above the ground. Either one of these signals triggers a local oscillator. The local oscillator produces clock pulses fed to a pulse counter which in turn provides for sequential calling on digital output channels which funrish information to be transmitted in a binary or any other type of code and in parallel by bit format. This may either be an identification code or a digitized altitude measuring result. The clock pulses are now used to convert these code words into a serial pulse train which in turn is used to key the transmitter oscillator. The transmitter oscillator is loosely coupled to an output amplifier to prevent reflection and frequency distortion of the signal and to increase the efficiency of the system. This amplifier feeds the antenna of the aircraft through the diplexer for broadcasting the reply information that is contained in the serial pulse train fed to the transmitter oscillator.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawing, in which:

FIGURE 5 is a table showing the circuit connections between the counter and the matrix.

FIGURE 6 is a truth table illustrating the opening and closing of certain of the matrix "and" gates as the counter steps through its various stages.

Figure 1A:
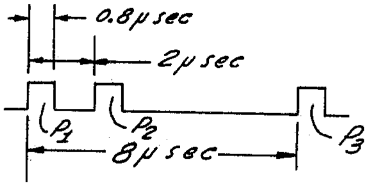
FIGURES 1A and 1B illustrate interrogation pulse codes to which the transponder of the invention must respond.
Figure 1B:
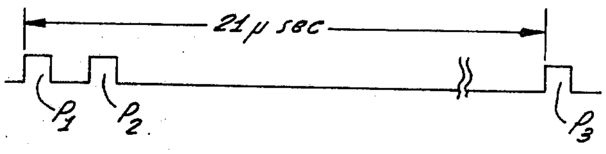
Figure 3:
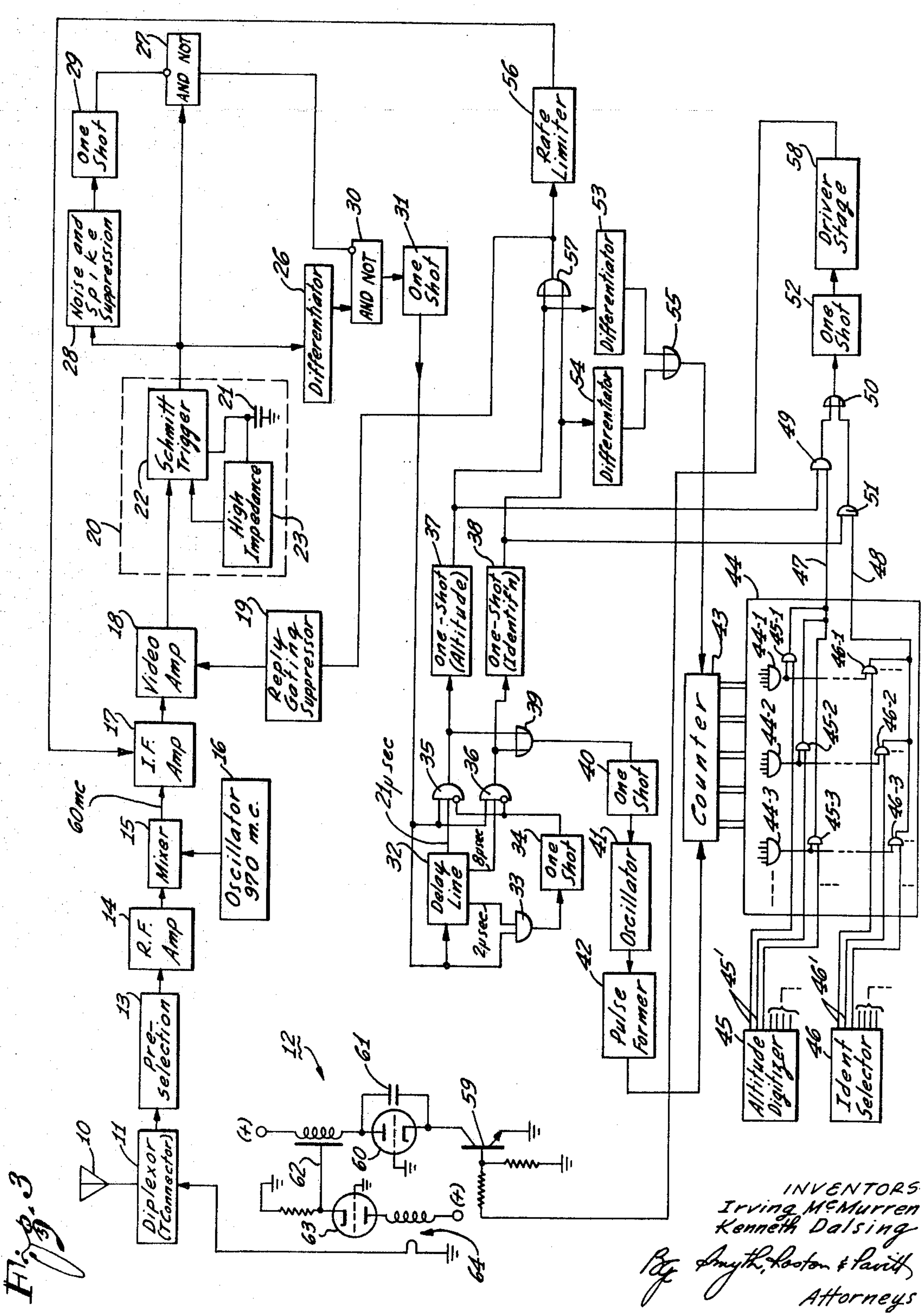
FIGURE 3 illustrates a block circuit diagram of a transponder in accordance with the preferred embodiment of the invention.

Before proceeding with the detailed description of the preferred embodiment of the invention shown in FIGURE 3, reference is made to FIGURES 1A and 1B. The purpose of the inventive transponder system is to respond to interrogation signals broadcasted from a ground station and being picked up by the aircraft's transponder antenna. Basically, two different types of interrogation are of interest. However, these interrogations will usually follow each other.

FIGURES 1A and B show the codes interrogation signals which respectively require the craft to identify itself (FIGURE 1A), or to inform the ground station as to the height of the craft (FIGURE B). Either type of signal when received by the aircraft transponder is used to trigger production and transmission of appropriate reply code signals. The identification interrogation signal is shown in FIGURE 1A and is comprised of a pulse P1 of .8 microseconds duration followed by a pulse P3 at 8 microseconds thereafter. An altitude information interrogation signal is shown in FIGURE 1B, and it includes also a pulse P1 to by succeeded by a pulse P3 at 21 microseconds thereafter.

Figure 2:
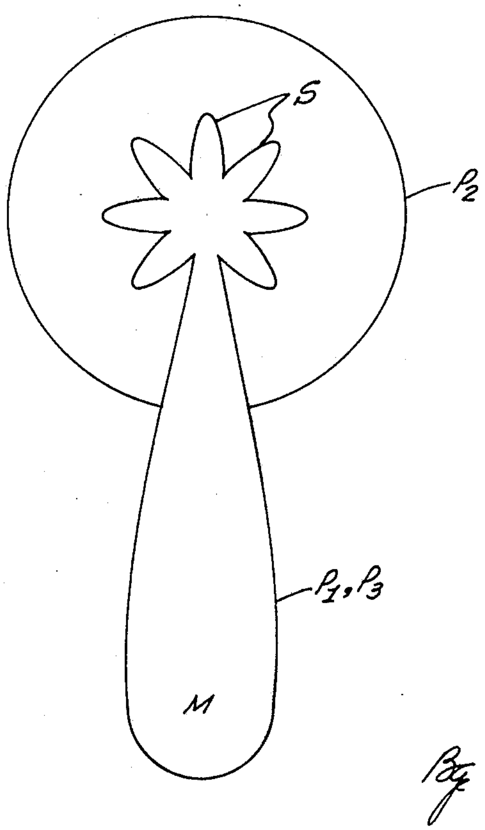
FIGURE 2 illustrates the horizontal field pattern of the ground interrogation signal.

The ground station usually broadcasts these types of interrogation signals by a directional antenna having a horizontal field pattern as shown in FIGURE 2 and being comprised of a main lobe M and side lobes S. The interrogating antenna rotates and sweeps the space around the ground station, but a response is desired only to signals received from the main lobe M, while responses to the side lobes S are to be suppressed. For this reason the ground station also emits a signal by means of an antenna having a non-directional characteristics or omnidirectional field pattern and emitting a pulse P2 always at 2 microseconds after a pulse P1 is transmitted by the directional antenna.

As will be described more fully below, the transponder system includes means to distinguish between main and side lobe signals by comparing a pulse P1 when received with a subsequently received pulse P2.

Proceeding now to the description of FIGURE 3, there is shown an antenna 10 which is of course mounted on the aircraft and it is preferably a vertically polarized L-band stub. The radiation pattern of this antenna 10 is unidirectional, and the VSWR is less than 1.3:1 in the range of interest which includes 1030 to 1090 mcs.

The antenna 10 is coupled to a diplexer 11. The function of the diplexer 11 is to provide signal isolation between the transponder receiver and the transponder transmitter since a common antenna is employed. In particular, the diplexer 11 is to separate the transmitter 12 from the circuit of the receiver, particularly the preselector 13 thereof. In between the diplexer proper and the antenna 10 there may be provided a low-pass strip line filter to terminate transmitter harmonics.

In terms of frequencies, the diplexer separates the transmitter frequency of 1090 mc. from the receiver signal frequency at 1030 mc. A T connector in diplexer 11 interconnects the antenna 10, the preselector 13 and the transmitter 12. The output coupling loop in the transmitter cavity is resonated at 1090 megacycles in conjunction with the plate circuit thereof, which will be described more fully below. At 1030 mcs. (receiver frequency) this output coupling loop appears as a short circuit and is reflected as a high impedance at the T-connector by virtue of the three-quarter wavelength transmission line thereof. Incoming signals at 1030 mc. are, therefore, passed to the preselector 13 with small attenuation.

The preselector has an input coupling loop which is resonated at 1030 mc. which reflects a high impedance to transmitter signals of 1090 mc. Therefore, the 1090 mc. signals from the transmitter 12 are passed to the antenna 10 also with little attenuation and very little passage of power from the transmitter back into the receiver.

The preselector is comprised of a conventional double tuned circuit with an input loop and an output circuit coupled through a transmission line to a radio frequency amplifier 14. The amplifier 14 has a resonant plate cavity tuned to 1030 mc. Signals from the plate line of radio frequency amplifier 14 are iris coupled to the cavity of a mixer 15. The mixer 15 additionally, receives oscillations from an oscillator 16 which preferably includes a nuvistor triode operated at 970 mc. and having individually tunable plate and grid cavities. Iris coupling is used along with inter electrode capacitance to maintain oscillation. Signals from the oscillator 16 are also iris coupled to the cavity of mixer 15.

The mixer cavity is resonated at 1030 mc. At proper signal levels from the radio frequency amplifier 14 and from the oscillator 16 sufficient bias results for the diode mixer 15 to produce an output signal at 60 mc. and at a level of approximately 2 decibels over the incoming signal at 1030 mc.

The output of the mixer 15 is fed to an IF amplifier which may include four transistor amplifier stages delivering in excess of 80 decibel gain at 60 mc. with an overall 3 decibel bandwidth of 7 mc. Selectivity and adequate rejection is provided by these four tuned transistor stages. The intermediate frequency amplifier 17 is designed to provide logarithmic relation between its input and output signals. A large dynamic range of about 50 decibels of input signals can thus be compressed into a smaller range of output signals, for example 10 decibels without destroying the relative amplitude information of the pulses received. This compression without loss of relative amplitude allows subsequent circuitry to discriminate between pulses on the basis of amplitude over a large dynamic range of input signals to provide adequate range for echo suppression and side lobe suppression to be described more fully below.

In addition, the intermediate frequency amplifier 17 receives an AGC signal from a source which will also be described more fully below and for purposes of restricting the response of the receiver in the transponder to a limited number of interrogations. It should be mentioned that due to the rather slow sweep of the ground antenna an aircraft will usually receive a large number of the same type of interrogating signals. Of course, only a few of them are needed to secure proper response, and it is undesirable to have the system continually responding to signals pertaining to the same interrogation cycle. Thus, in order to avoid any needless response and needless operation of the transponder the IF amplifier 17 is made to be effectively decoupled from the remainder of the circuit by lowering the AGC so that only usable signals will appear at the output side of the IF amplifier 17. Lowering of the AGC is suitable because it suppresses weaker interrogating signals resulting from mutual receding of main lobe M and aircraft.

The output of intermediate frequency amplifier 17 is fed to a video amplifier, i.e., a broadband amplifier 18 comprised of two stages having linear characteristics and providing approximately ten times voltage amplification. The first stage provides necessary gain which is stabilized by a large amount of feedback, and the second stage is an emitter follower providing a relatively low output impedance for purposes of impedance matching. The video amplifier 18 is also susceptible to gating signals derived from a suppressor control stage 19. This means, that as soon as the circuit network to be described in the following has received a code to which the transponder is to reply, the video amplifier 18 is being disabled immediately thereafter through the suppressor circuit 19, because as long as the transponder system replies, i.e., operates as transmitter, any interrogation signal which might then be received is not of interest, since no reply thereto is possible until the reply in progress is completed. Thus interrogation signals received during a transponder reply operation are suppressed.

The output signals furnished by the video amplifier 18 are passed to a pulse amplitude discriminator 20 of the ditchdigger type. The purpose of this discriminator or ditchdigger 20 is to provide for side lobe suppression.

Interrogation signals from the ground station are of interest only when the aircraft passes through the momentary position of the main lobe M. Looking briefly at FIGURES 1A, 1B and 2, one can see that pulses P1 or P2 have different amplitude relations when received by the aircraft while passing through the main lobe, or a side lobe. For main lobe interrogation the pulse P1, which is always the first pulse of any interrogation signal, should be larger in amplitude than the pulse P2 which is transmitted by the ground station through an unidirectional antenna at a two microsecond delay. On the other hand, if the pulse P2 is substantially equal to or even larger than a pulse P1 received by the transponder, this is an indication that the aircraft is passing through a side lobe S.

For reasons of eliminating response to side lobe interrogations, the ditchdigger 20 has its principal element a capacitor 21 which is charged rapidly by an output signal of the video amplifier 18 through a low impedance current path which may comprise a transitsor amplifier which also supplies the input signal to a Schmitt trigger 22. This Schmitt trigger 22 produces an output pulse of standard amplitude in response to each envelope representing an interrogation pulse. The duration of the pulse furnished by Schmitt trigger 22 is a precise replica of the first pulse or any subsequent pulse received by the system (0.8 microsecond). The amplitude of any such pulse is at a constant level. Thus, the trigger 22 eliminates any amplitude variation due to the variation of distance of the aircraft from the ground station.

The capacitor 21 has a particular charge at the end of a pulse which is proportional to the amplitude of the pulse. Since the charging path is of low impedance, the charge is substantially independent of the duration of the pulse. The charge voltage is fed to a high impedance inverter stage which applies a strong reverse bias for Schmitt trigger 22 proportional in value to the charge of capacitor 21. The inverter stage 23 is selected so that the bias it applies at first, i.e., immediately after termination of pulse such as P1, will in effect desensitize the input circuit of Schmitt trigger for any pulse of comparable amplitude (echo suppression). The charge of capacitor 21 bleeds off at a rate of 3 to 4 db per microsecond, so that after about two microseconds measured from the leading edge of pulse P1, the reverse bias has decreased to a value that a pulse of similar (or larger) amplitude than pulse P1 can overcome the bias to trigger the Schmitt trigger 22.

If the next intelligence pulse, which is the pulse P2 is large enough to overcome this reverse bias, the Schmitt trigger 22 responds again. Such a pulse P2 will also produce a constant amplitude pulse. Thus, this circuit 20 eliminates any pulse when its amplitude is less than that of the pulse closely preceding. The device 20 also eliminates a pulse that succeeds another pulse too rapidly. Pulses having a relative amplitude relation in which a succeeding pulse is not smaller than a preceding pulse are thus caused to create two pulses of similar amplitude which are passed on to a pulse width decoder to be described below.

The time required for the circuit to recover its overall sensitivity to small pulses after receiving a large pulse (echo suppression) is determined by the discharge rate of the capacitor 21. It is apparent that the circuit 20 recovers during the capacitor discharge, but may not be completely recovered when the next pulse, for example, an intelligence pulse P3 is received. However, this is not critical, because pulse P3 is of comparable amplitude to that of pulse P1 and will at any event overcome the reverse bias for the Schmitt trigger as provided by the impedance stage 23. Thus, a pulse pair P1 and P2 will be passed by the Schmitt trigger 22 as pulses P′ of constant amplitude at a distance of 2 microseconds from each other while each pulse P′ has a duration of its respective producing pulse P1 or P2. This occurs when the aircraft has passed through the side lobe and not through the main lobe of the interrogating beam. Only pulse P1 will be passed in case the aircraft passes through the main lobe; the relatively weaker pulse P2 is then suppressed by stage 20.

Proceeding now to the description of a pulse width decoder, its primary purpose is to prevent further passage of pulses that do not have a duration within a predetermined tolerance range. Pulses not meeting the duration requirement should not reach the decoding network since they might initiate a false reply and unnecessary and undesirable suppression of reception of true signals during such a reply. Random pulses with a duration of less than .4 microsecond are to be eliminated as well as pulses having a duration of more than 1.2 microseconds. Such pulses may result from randomly superimposed pulses or echoes. Also, the interrogation band might be used by other transmitters.

The purpose of the pulse width decoder 25 is, therefore, to render the remainder of the circuit responsive only to pulses having widths in the range of .4 microsecond to 1.2 microsecond, while shorter and longer pulses are to be suppressed.

For this purpose the output pulses P′ of Schmitt trigger 22 are first passed into a differentiating stage 26 which differentiates the output pulses, and particularly produces a signal representative of the respective trailing edge of such output pulse of trigger 22. Next, the pulse P′ of Schmitt trigger 22 is directly fed to the signal input of a gate circuit 27 of the "and not" gate type. Thirdly, the output of the Schmitt trigger 22 is fed to a noise and spike suppression stage 28 which eliminates signals of less than .4 microsecond. However, signals exceeding the range of .4 microsecond are passed on as delayed trigger signals to a single shot multivibrator 29 for triggering the same. The monostable circuit 29 produces an output signal for the duration of .8 microsecond and feeds this as an inhibiting signal to the gate 27 for blocking same. Any output of gate 27 is fed to the inhibitor input side of a "and not" gate 30. The signal input of "and not" gate 30 is connected to the output side of differentiating stage 26. Thus, gate 30 is open for passing the differentiated trailing edge of the Schmitt trigger output only for the astable period of monovibrator 29. In particular, when the Schmitt trigger 22 produces an output signal P′ of a duration of less than .4 microsecond, this pulse is passed as signal to the gate 27, and since the monovibrator 29 is in its stable state, the inhibit input of "and not" gate 27 is open and the pulse P′ is passed through the gate 27 as inhibiting input of "and not" gate 30. Thus, the "and not" gate 30 is closed for the trailing edge of the Schmitt trigger pulse P′ if following the leading edge thereof at less than .4 microsecond. The output of differentiator 26 is suppressed by the closed "and not" gate 30 accordingly.

If the Schmitt trigger 22 furnishes an output pulse P′ of proper duration, .8 microsecond, or having a deviation within the tolerance of less than ±.4 microsecond, then the pulse P′ is permitted to pass the suppressor stage 28 and will trigger the monovibrator 29. The monovibrator 29 now feeds its output signal to the inhibitor input of "and not" gate 27. Thus at the end of .4 microsecond from the beginning or leading edge of this pulse P′, "and not" gate 27 ceases to pass this pulse and, therefore, the inhibiting input of "and not" gate 30 is removed. If the trailing edge of the Schmitt trigger pulse is differentiated by stage 26 within the duration of the tolerance interval, it can pass the then open "and not" gate 30 into a monovibrator 31 for triggering the same for purposes to be described below.

A pulse P′ of a duration longer than 1.2 microseconds of course, will pass through stage 28 and it will then trigger monovibrator 29, but after 1.2 microseconds from the leading edge of this pulse, the monovibrator 29 returns to its stable state, and the gate 27 furnishes again an inhibiting signal for gate 30, so that finally the differentiation of the trailing edge finds again the "and not" gate 30 closed.

The purpose of monovibrator 31 is to provide a pulse of uniform duration and constant amplitude as a result of and in response to a differentiator output pulse originated from P1 or P2 or P3 received and having been processed by amplitude and width discriminators. It will be appreciated that an output pulse of monovibrator 31 has a fixed time relationship with its incoming initiating pulse P1, P2, or P3. Since the output of "and not" gate when true practically coincides with the trailing edge of any proper pulse received by the receiver, the monovibrator 31 is in effect triggered at the trailing edge of any such input pulse. With the aid of monovibrator 31, the pulses received are finally processed to the extent that they differ only in time-phase relationship permitting pulse position decoding.

The output of monovibrator or monostable multivibrator 31 is fed first to a delay line 32. The delay line has taps at 2 and 8 microseconds and provides a maximum delay of 21 microseconds.

The first function of the pulse position discriminator 70 is that of side lobe suppression. It will be recalled that a pulse P2 of similar or higher amplitude than the pulse P1 is permitted to pass the system only when the aircraft passes through a side lobe. No reply to such lobe interrogation is desired so that the reply circuit is to be inhibited. An interogation is identified by a pulse pair P1 and P3 following each other at a specific delay which characterizes the type of interrogation. Thus a reply will commence only after a P3 pulse has in fact been received. A pulse P2 when true now is used to control suppression of the succeeding pulse P3, so that a reply is inhibited. A pulse pair P1 and P2 of a side lobe interrogation is permitted to cause triggering of the monovibrator 31 twice at proper time and phase relationship.

The monovibrator 31 feeds a first input signal to the delay line 32 (representing P1), and the 2 microsecond tap feeds this delayed signal to ine input terminal of an "and" circuit 33. The second input terminal of "and" circuit 33 responds directly to any output of monovibrator 31.

The "and" gate 33 will respond to a coincidence of an undelayed pulse representing P2 and delayed pulse representing P1, the delay being 2 microseconds which is the time difference between the P1 and P2 pulses. It will be appreciated that this P1, P2 detection is susceptible to a tolerance given by the pulse width of the output signal to monovibrator 31. The pulses P1 and P2 may have a phase shift deviation relative to the 2 microseconds delay of the delay line, which deviation is given by the pulse width of the monovibrator 31 thus determined the tolerance range of "and" gate 33. Since usually about 1 microsecond tolerance range is desired, the pulse width of monovibrator 31 will be 1 microsecond.

A pulse P2 passing the amplitude discriminator 20 and following the pluse P1 at 2 microseconds ±1 microsecond will cause "and" gate 33 to respond, and "and" gate 33 triggers a monovibrator 34 providing a signal for a period of time slightly longer than the maximum interrogation interval. The maximum interrogation interval is about 23 microseconds measured from the leading edge of a P1 pulse to the trailing edge of a P3-altitude interrogation pulse at unfavorably late tolerance for P3. The earliest monovibrator 34 can be triggered is 2 microseconds after the leading edge of P1 so that the maximum period of time needed to cover any occurrence of P3 at unfavorable tolerance is 21 microseconds from the triggering of monovibrator 34.

The output signal of monovibrator 34 controls the suppression of P3 detection. For this purpose monovibrator 34 is connected to inhibiter input terminals of "and not" gates 35 and 36. These "and not" gates are blocked for the astable period of monovibrator 34 which is the time in which a P3 pulse will occur.

The reply, or more precisely, the initiation of a reply by the transponder is controlled by the output signal of gate 35 or of 36 is provided the pulse P2 is between two interrogation pulses P1 and P3 was suppressed at the trigger 22. A pulse P2 of too large an amplitude ultimately causes blocking of these gates 35 and 36 preventing these gates from responding to P3 pulses, and the transmitter portion of the transponder will not be triggered.

The delay line 32, has, as was stated above, a 8 microsecond tap which is fed to a second input terminal of "and not" gate 36, while the 21 microsecond delay output of delay line 32 is fed to a second input terminal of gate 35. Additionally, the "and not" circuits 35 and 36 receive directly the output of monovibrator 31.

The monovibrator 31 of course produces also an output signal when a pulse P3 is properly received. Thus the two inputs of gate 35 will receive coincidence signals which include a pulse P1 delayed by 21 microseconds and a pulse P3 following the pulse P1 by 21 microseconds, provided the interrogation is directed to the altitude of the craft. If a pulse P3 follows a pulse P1 by 8 microseconds, then the two signal inputs of gate 36 will respond, on one hand, to an undelayed P3 signal and on the other hand, to a P1 signal delayed by 8 microseconds. Coincidence at gate 36 is an indication that the ground station interrogates the craft as to its identification. The gates 35 or 36 will respond only if there was no P2 pulse so that the inhibitor input of either of these gates does not block them.

Either one of the "and not" circuits 35 and 36 when producing an output controls the initiation of the response by the transponder to the respective type of interrogation. To facilitate the description of the invention, the output signal of "and not" gate 35 will in the following be called an altitude interrogation signal, and the output of "and not" gate 36 will be called identification interrogation signal.

The output signals of "and not" gates 35 and 36 respectively triggers monovibrators 37 and 38. The astable period of either monovibrator 37 and 38 is selected to respectively cover the period of time that is necassary to transmit an encoded signal which is respectively indicative of the altitude or of the identification code of the aircraft within standards set for this purpose. The output pulses of "and not" circuits 35 and 36 are, furthermore, combined in an "or" gate 39 having its output side connected to the input terminal of a multivibrator 40.

The monostable multivibrator 40 emits a pulse which is of a duration longer than the reply code time for either altitude or identification code transmission. The output signal of the monovibrator 40 is used to key or gate open an oscillator 41. In order to be compatible with standard equipment used for aircraft communication, the oscillator oscillates at a frequency of 689.655 kc. which is an oscillation period of 1.45 microseconds.

It will be observed that the "and not" gates 35 and 36 as was stated above, are activated at the trailing edge of a pulse P3 as recovered in the RF circuit network described above. In view of the instantaneous character of the electronic circuit elements employed, it can be said that this trailing edge, therefore, practically coincides with the commencement of oscillations of oscillator 41 so that each cycle that the oscillator emits is time related to the initial triggering P3 pulse, so that the reply as controlled by this network for transmitter action by the transponder has a definite time relation to this P3 pulse.

The train of sine waves produced by oscillator 41 is passed on to a pulse former 42 such as the Schmitt trigger. The output of Schmitt trigger serves as local clock pulse source to be passed on to a suitable counter 43. This counter will comprise, in the usual manner, a plurality of interconnected bistable flip-flops to either form a binary counter or a shift register type counter. A binary counter is preferred, but the basic structure of this counter unit is immaterial since it is of importance only, that the stages (flip-flops) of counter 43 assume different combinations of set and reset states in synchronism with the pulses produced and as derived from pulse former 42. The counter 43, may, for example, be comprised of five bistable flip-flops interconnected as a binary counter and thus being capable of assuming thirty-two different counting states. Accordingly the altogether ten output terminals of this counter 43 include at all times five outputs which are true and five which are false, and there exist thirty-two combinations of five respective true outputs, each such combination defining one counting state and only one is true at any time.

The counter is used as a sequential calling device to sequentially gate open, for example, "and" gates such as 44–1, 44–2, 44–3, etc. and there are as many "and" gates as different counting states are needed for encoding. The number of counting states needed depends on the format of the information code to be transmitted. In other words there are as many different counting states needed for processing as there are bits necessary to define altitude and identification codes for purposes of transmission.

A matrix 44, therefore, includes "and" gates such as 44–1, 44–2, 44–3 and others, each having five input terminals respectively connected to five output terminals of the counter 43, and only one of these "and" gates at a time is being enabled, thereby defining the particular binary position within the code to be transmitted.

Figure 4:
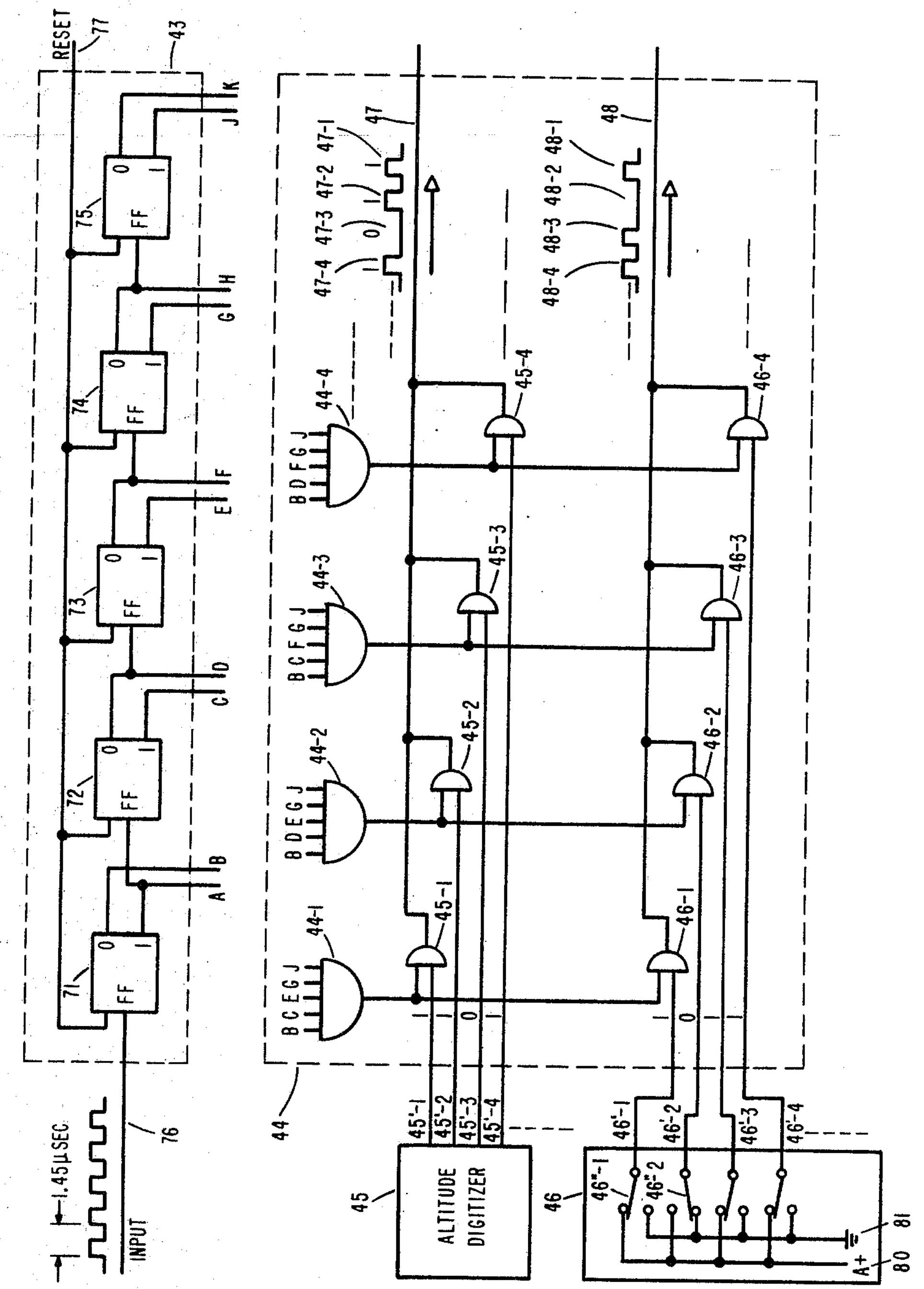
FIGURE 4 illustrates a block circuit diagram showing in greater detail the counter, matrix, altitude digitizer and identity selector shown in FIGURE 3.

Referring to FIGURE 4, counter 43 contains five flip-flop elements 71, 72, 73, 74 and 75. Counter 43 is shown in the "Reset" condition with "1" indicating the presence of voltage and "0" indicating the absence of voltage. As has been previously discussed, the output of pulse former 42 is a series of pulses occurring at 1.45 microsecond intervals. This pulse train is applied to the input 76 of counter 43. Counter 43 has ten possible output lines designated A, B, C, D, E, F, G, H, J and K. These counter output lines can be connected in thirty-two possible combinations of five lines each ($2^5$).

Matrix 44 includes sixteen "and" gates 44–1, 44–2, 44–3, . . . 44–16, each having five input terminals and one output terminal; sixteen "and" gates 45–1, 45–2, 45–3, . . . 45–16, and sixteen "and" gates 46–1, 46–2, 46–3, . . . 46–16, each having two input terminals and one output terminal. The input terminals of "and" gates 44–1, 44–2, etc., are connected to various output terminals of counter 43. FIGURE 5 is a table showing these interconnections for the various gates. Gate 44–1 input terminals are connected to counter 43 output terminals B, C, E, G and J. Similarly, gate 44–2 input terminals are connected to counter 43 output terminals B, D, E, G and J.

The output of "and" gate 44–1 is connected to the inputs of "and" gates 45–1 and 46–1. In like manner, the output of "and" gate **44–*n***, where *n* varies from 1 to 16, is connected to the input of "and" gates **45–*n* and 46–*n*. The second input of each "and" gate 45–*n* is the output 45′–*n* of altitude digitizer 45. In like manner, the second input of each "and" gate 46–*n* is the output 45′–*n* of identity selector 46. In the transponder system illustrated both the altitude digitizer 45 and identity selector 46 has sixteen output lines 45′–1, 45′–2, . . . 45′–16 and 46′–1, 46′–2, . . . 46′–16**, respectively. A sixteen bit binary signal can, therefore, be transmitted by this transponder.

Identity selector consists of a A+ voltage bus 80, a grounded bus 81, and sixteen double pole, single throw switches 46″–1, 46″–2, . . . 46″–16 which can select either A+ voltage bus 80 or grounded bus 81. For illustrative purposes it will be assumed that the binary number identifying the particular aircraft under consideration is 1011111111111111. Switch 46″–2 is positioned to select the grounded bus. The other switches are positioned to select the A+ bus. Therefore, identity selector output 46′–2 is grounded, while the other output lines have A+ voltage impressed thereon. For simplicity, only the first four identity selector outputs 46′–1, 46′–2, 46′–3, and 46′–4 have been shown. The correct binary number for the particular aircraft appears on these output lines in a parallel by bit format. In like manner, it will be noted that the binary number 1101 . . . appears in a parallel by bit format on the output lines of altitude digitizer 45.

FIGURE 6 is the truth table of counter 43. Referring simultaneously to FIGURES 3, 4, 5 and 6, with counter 43 in the "Reset" state counter outputs A, C, E, G and J are energized. This combination of counter outputs does not correspond to any combination of "and" gate **44–*n* inputs and no "and" gate 44–*n* is activated, therefore, no "and" gates 45–*n* or 46–*n* will be activated and no output appears on matrix output lines 47 and 48. Assuming now that the transponder has been interrogated as to altitude, as has been previously discussed, the one-shot altitude monovibrator 37 applies a pulse to altitude "and" gate 49 and a string of pulses P″ at 1.45 microsecond intervals is produced by oscillator 41 and pulse former 42 and appears at counter 43 input 76. The first pulse P″ #1 steps counter 43 one step, activating counter outputs B, C, E, G and J. These are the inputs to "and" gate 44–1, therefore, "and" gates 44–1, 45–1 and 46–1 are activated and a pulse 47–1 appears at matrix output 47 and a pulse 48–1 appears at matrix output 48. The second pulse P″ #2 steps counter 43 another step, activating counter outputs A, D, E, G and J. These outputs correspond to no "and" gate 44–*n* inputs and matrix 44 becomes non-conductive. Matrix output pulses 47–1 and 48–1 terminate. Third pulse P″ #3 advances counter 43 another step activating counter outputs B, D, E, G and J. This enables "and" gates 44–2, 45–2 and 46–2 and a pulse 47–2 appears on matrix output 47. However, since the second input to "and" gate 46–2 is grounded, corresponding to logic "0," no output appears in the 48–2 space of matrix output 48. In like manner, the various other pulses and spaces 47–*n* and 48–*n* appear on matrix output buses 47 and 48**, respectively, in a serial by bit format at 1.45 microsecond intervals.

Assuming, now, that an altitude interrogation pulse has passed through gates 35 and 39 to initiate the aforediscussed encoding process, this same altitude interrogation pulse has simultaneously triggered altitude monovibrator 37, the astable period of which, as has been previously discussed, is chosen so as to cover the time necessary to transmit an encoded signal. This output pulse from monovibrator 37 is applied to and opens "and" gate 49 allowing the encoded signal containing altitude information to pass therethrough. In like manner, if the encoding initiating pulse were an identification interrogation signal, which as has been discussed would pass through gates 36 and 39, identification monovibrator would have been triggered and its output pulse would have opened "and" gate 51, thereby allowing the encoded identification signal to pass therethrough.

Thus, the gate 49 is gated open for deriving an encoded signal from the matrix gate 44 through the line 47 in case there is an altitude interrogation. Similarly, the gate 51 is gated open by the output pulse of monovibrator 38 which is triggered in case there is an identification interrogation. The output signal of "and" gates 49 and 51 are combined in an "or" circuit to trigger a monovibrator 52. A single input for monovibrator 52 is permissible because the gates 49 and 51 are never open at the same time. The monovibrator 52 is a pulse shaper to particularly define the bit length of each bit to be transmitted.

Before proceeding to the description of the transmission section of the transponder a further processing of the signals from gates 35 and 36 and monovibrators 37 and 38 is to be described. It will be recalled, that the astable periods of monovibrators 37 and 38 respectively cover the period of time needed for altitude and identification code transmission. The output pulses of monovibrators 37 and 38 are respectively passed to differentiator stage 53 and 54 which respond to the respective trailing edges of the monovibrator output signals, so that at the end of the time interval as defined by the respective monovibrator output pulse, a trigger signal appears at the input side of an "or" gate 55. This "or" gate 55 is used to reset the counter 43 to count-state zero or to the normal state at the end of the period of time set aside for a reply, and the counter 43 is therefore prepared for the next reply.

The output pulses from the monostable vibrator 37 or 38 are additionally sent to a rate limiter 56 through an "or" gate 57 for purposes of integration. This rate limiter 56 is an integrator stage which responds to the D.C. signals furnished by the monovibrator 37 or 38 for counting or integrating them, so as to control the number of immediately succeeding interrogations-replies handled by the system.

The output signal of the limiter 56 is, therefore, a D.C. voltage which in effect is proportional to the number of sequential inquiries to which the transponder has responded. This D.C. signal is amplified and applied to the intermediate frequency amplifier 17 to control the AGC thereof which will permit only the strongest interrogations to come through the system. After several inquiries have been handled by the transponder, the rate limiter 56 causes the intermediate frequency amplifier 17 to block so that the weakening interrogatory pulses received as the aircraft recedes from the main lobe, will in effect be suppressed as being needlessly repetitious.

Finally, the output of "or" gate 57 which in effect is the D.C. pulse of either monovibrator 37 or of monovibrator 38 is used to directly trigger the suppressor stage 19 which is a D.C. amplifier, providing an inhibiting type gating signal for the video amplifier. The reply duration is always governed by the astable states of monovibrator 37 or monovibrator 38. Thus, for the duration of these monovibrator output signals, the decoding of any signal received during reply is inhibited.

Proceeding now to the description of the transmitter, reference again is made to the monovibrator 52 which responds to the individual output pulses of "or" gate 50 serially provided by the matrix 44. The train of pulses fed to the monovibrator 52 is the code signal to be transmitted, and these pulses are received at time intervals which are either 1.45 microseconds or integral multiple thereof. The monovibrator 52 itself produces pulses of .45 microsecond duration. These pulses are fed to an amplifier stage 58. The stage 58 is the driver stage for the transmitter 12.

The output pulses of stage 58 are fed to transistor 59 rendering it conductive for the duration of a pulse (0.45 microsecond) and thereby controlling the cathode potential of a pencil triode 60 operated in a grounded grid configuration in a coaxial cavity. The feedback from the cathode cavity to the plate cavity produces sufficient capacitive coupling, as symbolically denoted by capacitor 61, to sustain oscillation. The plate circuit tuning determines the frequency of the pulsed oscillator. The oscillation of the oscillator circuit which includes the triode 60 is tuned to a 1090 megacycle frequency, and the modulation is strictly of the pulse keying type in that the transistor 59 turns the oscillator on and off at the rate of the signal to be transmitted. Loop coupling to the plate cavity provides the output. The output loop includes a transformer having the primary circuit connected in series with the plate of tube 60 and having an output coupling circuit 62. The coupling itself is a very weak one. The oscillator output produces, for example, about 450 watts, but only 75 watts are being drawn from this oscillator circuit through the output coupling loop 62.

Thus, in operation each of the pulses from modulator driver 58 biases the modulator transistor 59 to conduction for the duration of such pulse thereby removing temporarily the cut-off bias from the cathode of pencil triode 60 and causing the circuit to oscillate. The output power derived by coupling loop 62 is only about ⅙ of the oscillator power due to the light coupling between the oscillator proper and the output loop. This provision prevents reflection by the signal from the antenna circuit and the diplexer back into the oscillator, which reflection causes frequency variations.

The output loop 62 controls the cathode bias of another pencil triode 63 also operated in a grounded grid configuration and having a transformer output circuit 64. Triode 63 serves as an amplifier having a gain of 10/1. The coupling of input and output circuits of the transformer 64 is a strong one since any signal reflected into this amplifier does not distort the frequency of the signal to be transmitted. Thus, the amplifier circuit is coupled lightly only to the oscillator circuit, but a strong coupling can be had between the diplexer input and the amplifier output to take full advantage of the amplifier gain. The antenna will receive about 500 to 700 watts peak pulse power. The utilization of an amplifier as coupling element between the diplexer and the transmitter permits a reduction in operating potential for the oscillator and the overall power consumption is reduced. Furthermore, the utilization of an amplifier in the oscillator output circuit permits an increase in efficiency of the system. The efficiency of this oscillator amplifier system is approximately 55 percent which is considerable improvement over transponder transmitters.

The driver stage 58 may additionally control a lamp circuit which is turned on when a reply commences and causes a cockpit mounted lamp to flicker during the time of transponder reply as an indication to the pilot that his plane is being interrogated and that a reply is transmitted. The output of matrix 44 may additionally receive a pulse from a source which provides one pulse for each identification reply and for a duration of 15 to 30 seconds, whenever the pilot presses a special identification button.

The invention is not limited to the embodiment described above, but all changes and modifications thereof not constituting departures from the spirit and scope of the invention are intended to be covered by the following claims.

What is claimed is:

1. A transponder for transmitting various coded information signals in response to coded interrogation signals received from a remote station, the combination comprising:

a network for receiving said interrogation signals and providing a pulse sequence indicative of the particular coded interrogation signal received;

a pulse width discriminator connected to said network and having a pulse width passage range rejecting pulses shorter and longer than said range;

a normally disabled oscillator providing oscillations when enabled;

a pulse decoder connected to said pulse width discriminator providing an individual signal representing the pulse sequence permitted to pass said discriminator when said pulse sequence corresponds to any one of a plurality of predetermined pulse sequences;

means enabling said oscillator in response to said individual signal;

signal code selectors providing binary type codes in parallel by bit format;

a counter sequentially shifting through different counting states upon receiving said oscillations;

means for interconnecting said counter, said decoder and said signal code selectors to provide a single serial by bit code signal representative of one said parallel by bit format selected by said individual signal and at a rate determined by said counter;

and a transmitter including a carrier frequency oscillator keyed by and responsive to said serial bit code signal.

2. A transponder for transmitting coded information signals in response to coded interrogation signals received from a remote station, the combination comprising:

a network converting said interrogation signals received into pulses indicative of an interrogation signal;

an interrogation signal decoder connected to receive said pulses and providing an individual signal defining said pulses;

a normally disabled oscillator providing oscillations when enabled;

means enabling said oscillator for the duration of said individual signal;

a signal code selector providing a code in parallel by bit format;

means for converting said code into a serial by bit format in response to and at a rate determined by said oscillations; and means for transmitting said serial by bit format code as a response to said interrogation signal.

3. A transponder for transmitting coded information signals in response to coded interrogation signals received from a remote station, the combination comprising:

a receiving network converting an interrogation signal into pulses indicative of the particular coded interrogation signal received;

a gate connected to receive a signal representative of the trailing edge of any of said pulses;

means responsive to each of said pulses to provide a gating-open signal for said gate for the duration of the time interval commencing at a first predetermined time after occurrence of the leading edge of said pulse and terminating at a second predetermined time thereafter;

an interrogation decoder connected to receive signals permitted to pass through said gate and providing an individual signal defining the signal sequence permitted to pass through said gate;

reply code formation means providing different types of binary coded information each in a parallel by bit format;

an oscillator providing a train of pulses;

a counter responsive to said pulse train sequentially shifting through different counting states upon receiving said pulses;

means for interconnecting said counter, said decoder and said reply code formation means to provide a serial by bit code signal representative of one said parallel by bit coded format of the type determined by said individual signal;

and a transmitter including a carrier frequency oscillator keyed by said serial code signal.

4. A transponder for transmitting coded information signals in response to coded interrogation signals received from a remote station, the combination comprising:

a network providing pulses indicative of a received interrogation signal;

a gate connected to receive a signal representative of the trailing edge of any of said pulses;

means responsive to each of said pulses to provide a gating-open signal for said gate for the duration of the time interval commencing at a first predetermined time after occurrence of the leading edge of said pulse and terminating at a second predetermined time thereafter;

an interrogation decoder connected to receive signals permitted to pass through said gate and providing an individualized signal defining said signal sequence permitted to pass;

a normally disabled oscillator providing oscillations when enabled;

means for enabling said oscillator in response to said individualized signal;

reply code formation means providing an encoded pulse sequence, constituting a reply to said interrogation signal, said sequence being generated at a rate determined by said oscillations;

and a transmitter connected to said reply code formation means for automatically transmitting said pulse sequence.

5. A transponder, including an antenna, for transmitting coded information signals in response to coded interrogation signals received from a remote station, the combination comprising:

a network receiving said interrogation signals and providing pulses representing the particular interrogation signal received;

a pulse decoder responsive to said pulses providing an individual signal distinguishing between the different types of interrogations to which the transponder is to reply;

a local oscillator generating clock pulses;

at least one digitizing means providing encoded information in parallel by bit format each of which contains different information;

a counter driven by said clock pulses and sequentially shifting through different counting states;

means for interconnecting said counter, and said digitizing means to simultaneously convert each said parallel by bit format into serial by bit pulse trains, the rate of serial bit formation being determined by said counter;

means responsive to said individual signal for selecting a particular serial by bit pulse train;

an electronic ultra high frequency oscillator keyed by said pulse train;

an amplifier having a low input coupling to receive a small fraction of energy from said ultra high frequency oscillator and having a gain to overcome the power loss resulting from said low coupling;

and means for coupling said amplifier to said antenna.

6. A transponder for transmitting coded information signals in response to interrogation signals received from a remote station, the combination comprising a network receiving said interrogation signals and providing a pulse sequence indicative of the particular interrogation signal received;

a decoder responsive to said pulse sequence providing an individual signal of said particular interrogation signal when said pulse sequence is of a predetermined type;

a normally disabled oscillator providing oscillations when enabled;

means enabling said oscillator in response to said individual signal;

an altitude digitizer providing an altitude indicating signal in a parallel by bit format;

an identification selector providing an identification code signal in parallel by bit format;

a counter connected to said oscillator for sequentially defining a plurality of counting states in response to said oscillations;

means responsive to said counting states for converting said digitizer and selector parallel by bit formats into serial by bit formats;

means responsive to said individual signal for selecting one said serial by bit format; and a transmitter including a carrier frequency oscillator keyed by said selected serial by bit format.

References Cited

UNITED STATES PATENTS

| | | | |
|---|---|---|---|
| 2,824,301 | 2/1958 | Levell et al. | 343—6.5 |
| 2,966,675 | 12/1960 | Smoll | 343—6.5 |
| 3,058,104 | 10/1962 | Garfinkel et al. | 343—6.5 |
| 3,122,737 | 2/1964 | Setrin | 343—6.5 |

RODNEY D. BENNETT, *Primary Examiner.*

CHESTER L. JUSTUS, *Examiner.*

D. C. KAUFMAN, *Assistant Examiner.*